(12) United States Patent
Chen

(10) Patent No.: US 6,481,728 B2
(45) Date of Patent: Nov. 19, 2002

(54) BRAKING STRUCTURE FOR A SCOOTER

(76) Inventor: Shou-Mao Chen, 344, Sec. 1, Chung San Rd., Ta-Cha Township, Taichung Hsien (TW)

( * ) Notice: Subject to any disclaimer, the term of this patent is extended or adjusted under 35 U.S.C. 154(b) by 0 days.

(21) Appl. No.: 09/773,468

(22) Filed: Feb. 2, 2001

(65) Prior Publication Data

US 2002/0105157 A1 Aug. 8, 2002

(51) Int. Cl.$^7$ .......................... B06T 1/04; A63C 17/14; B62M 1/12
(52) U.S. Cl. .......................... 280/87.041; 280/11.215; 188/29; 188/19
(58) Field of Search .......................... 280/87.041, 87.042, 280/87.03, 87.021, 11.215; 188/19, 29

(56) References Cited

U.S. PATENT DOCUMENTS

| | | | | |
|---|---|---|---|---|
| 1,714,000 A | * | 5/1929 | Davis | 280/87.041 |
| 2,180,143 A | * | 11/1939 | Fletcher | 280/87.041 |
| 2,723,131 A | * | 11/1955 | McChesney, Jr. | 280/87.041 |
| 4,003,582 A | * | 1/1977 | Maurer | 280/87.041 |
| 4,037,852 A | * | 7/1977 | Bayer et al. | 280/87.041 |
| 4,099,734 A | * | 7/1978 | Lowery | 280/87.041 |
| 4,168,076 A | * | 9/1979 | Johnson | 280/87.041 |
| 4,234,204 A | * | 11/1980 | Tibbals | 280/87.041 |
| 4,394,029 A | * | 7/1983 | Holmgren | 280/87.041 |
| 4,799,701 A | * | 1/1989 | Lindau et al. | 280/87.041 |
| 4,915,403 A | * | 4/1990 | Wild et al. | 280/87.041 |
| D346,418 S | * | 4/1994 | Fischbach | 280/87.041 |
| 6,139,035 A | * | 10/2000 | Tsai | 280/87.041 |
| 6,296,082 B1 | * | 10/2000 | Tsai | 280/87.041 |
| 6,298,952 B1 | * | 10/2001 | Tsai | 280/87.041 |
| 6,302,415 B1 | * | 10/2001 | Wang et al. | 280/87.041 |
| 6,311,994 B1 | * | 11/2001 | Wang et al. | 280/87.041 |
| 6,352,270 B1 | * | 3/2002 | Wu | 280/87.041 |

* cited by examiner

*Primary Examiner*—Brian L. Johnson
*Assistant Examiner*—Jeffrey J. Restifo
(74) *Attorney, Agent, or Firm*—Harrison & Egbert

(57) ABSTRACT

A scooter has a braking structure including a footboard, a pivoting member for pivotally mounting the footboard on the scooter base, and a recovery member enabling the footboard to return to its original position. The footboard has a curved rear segment which is separated from the scooter rear wheel by a distance. As the curved rear segment is pressed by the foot heel of a rider of the scooter, the curved rear segment swivels on the pivoting member to press against the scooter rear wheel.

2 Claims, 6 Drawing Sheets

BRAKING STRUCTURE FOR A SCOOTER

BACKGROUND OF THE INVENTION

1. Field of the Invention

The present invention relates generally to a scooter, and more particularly to a braking structure for the scooter.

2. Description of Related Art

As shown in FIGS. 1 and 2, a prior art scooter 10 is provided with a rear fender 11, which is disposed over the rear wheel 14 to protect against splashing mud. The pivoting portion of the rear fender 11 is provided with a spring 12 and a shaft 13, which enable the rear fender 11 to make contact with the rear wheel 14 so as to slow down or stop the rear wheel 14. In other words, the rear fender 11 serves as a braking device of the scooter 10. The rear fender 11 cannot serve effectively as a brake in view of the fact that the rear fender 11 is apt to move aside at the time when it is pressed with the foot heel of a scooter rider. In addition, the service life span of the rear fender 11 is seriously shortened by the constant friction between the rear fender 11 and the rear wheel 14.

BRIEF SUMMARY OF THE INVENTION

The primary objective of the present invention is to provide a scooter with a braking structure which is free of the drawbacks of the scooter braking device of the prior art described above.

In keeping with the principle of the present invention, the foregoing objective of the present invention is attained by a scooter braking structure comprising a curved footboard, a footboard pivoting member, and a footboard recovering member. The footboard is pivoted with a scooter base such that the rear segment of the footboard is curved upward away from the rear wheel of the scooter, thereby resulting in a space between the curved rear segment of the footboard and the rear wheel. As the rear segment is exerted on by an appropriate external force to move downward to press against the rear wheel in motion, the scooter is slowed down our stopped. As soon as the rear segment of the curved footboard is relieved of the external force exerted thereon, the footboard is provided by the footboard a recovering member with a recovery force to help the footboard return to its original position.

BRIEF DESCRIPTION OF SEVERAL OF THE DRAWINGS

DETAILED DESCRIPTION OF THE INVENTION

Figure 1:
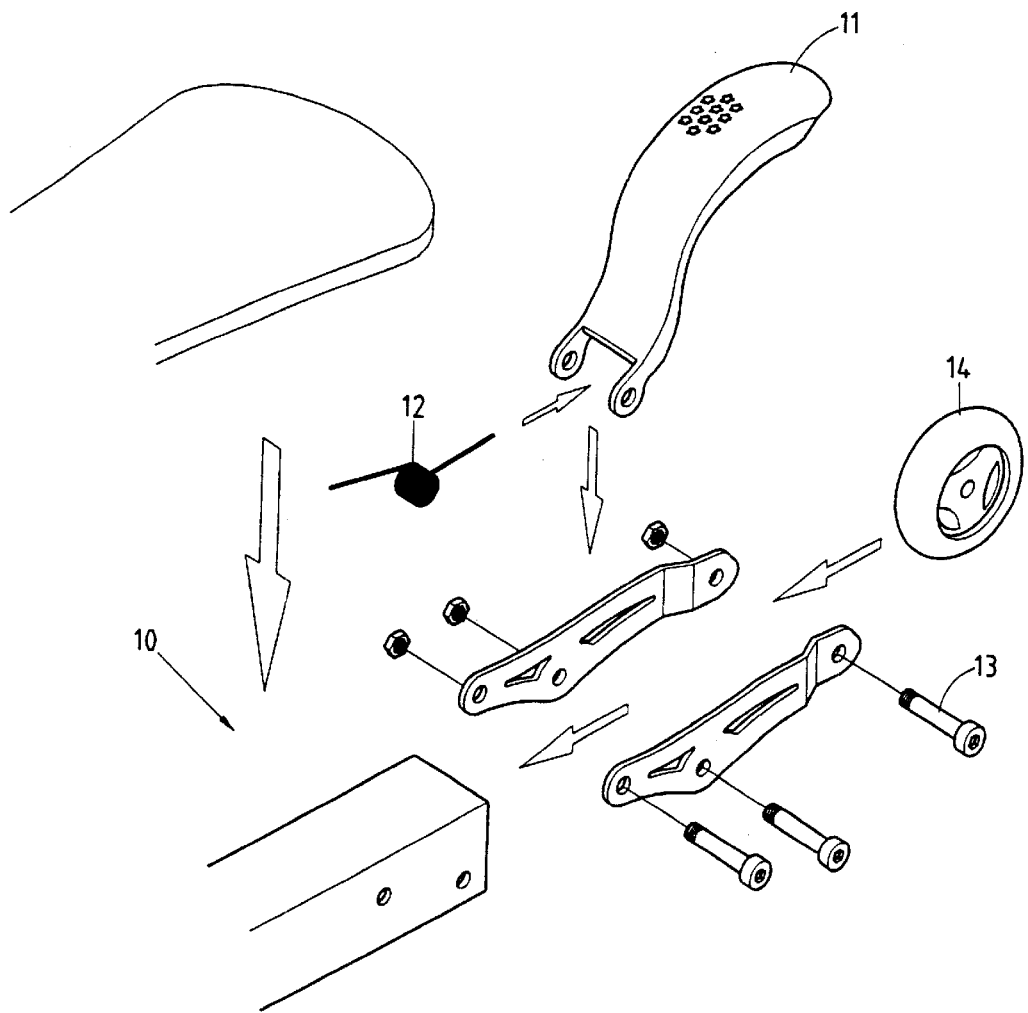
FIG. 1 shows an exploded view of a scooter braking device of the prior art.
Figure 2:
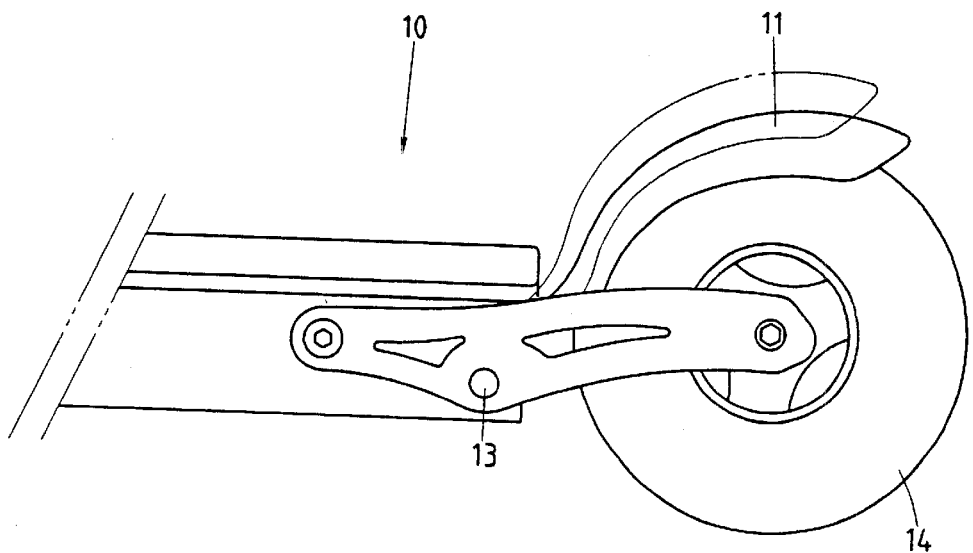
FIG. 2 shows a schematic side view of the prior art scooter braking device.
Figure 3:
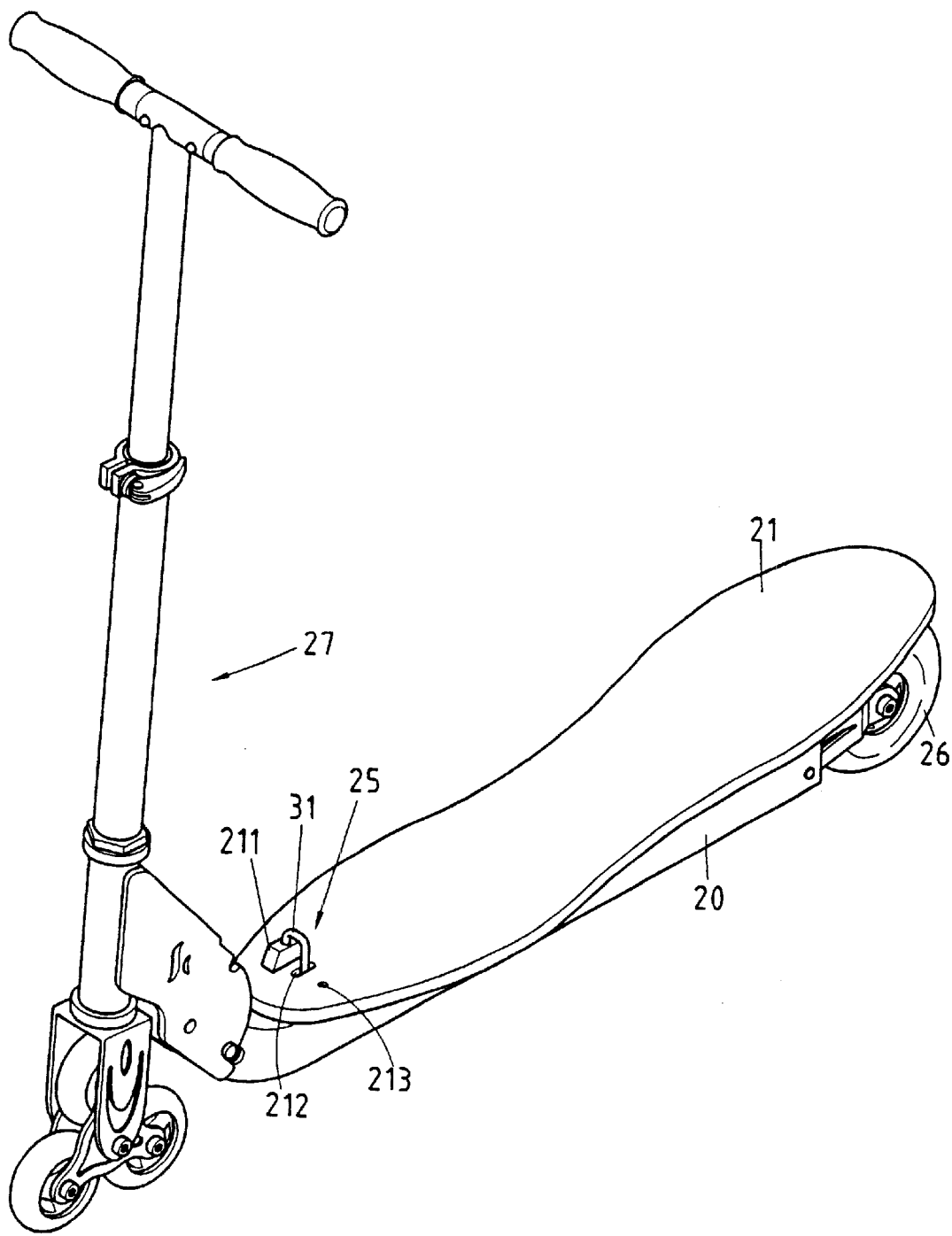
FIG. 3 shows a perspective view of a scooter of the present invention.
Figure 4:
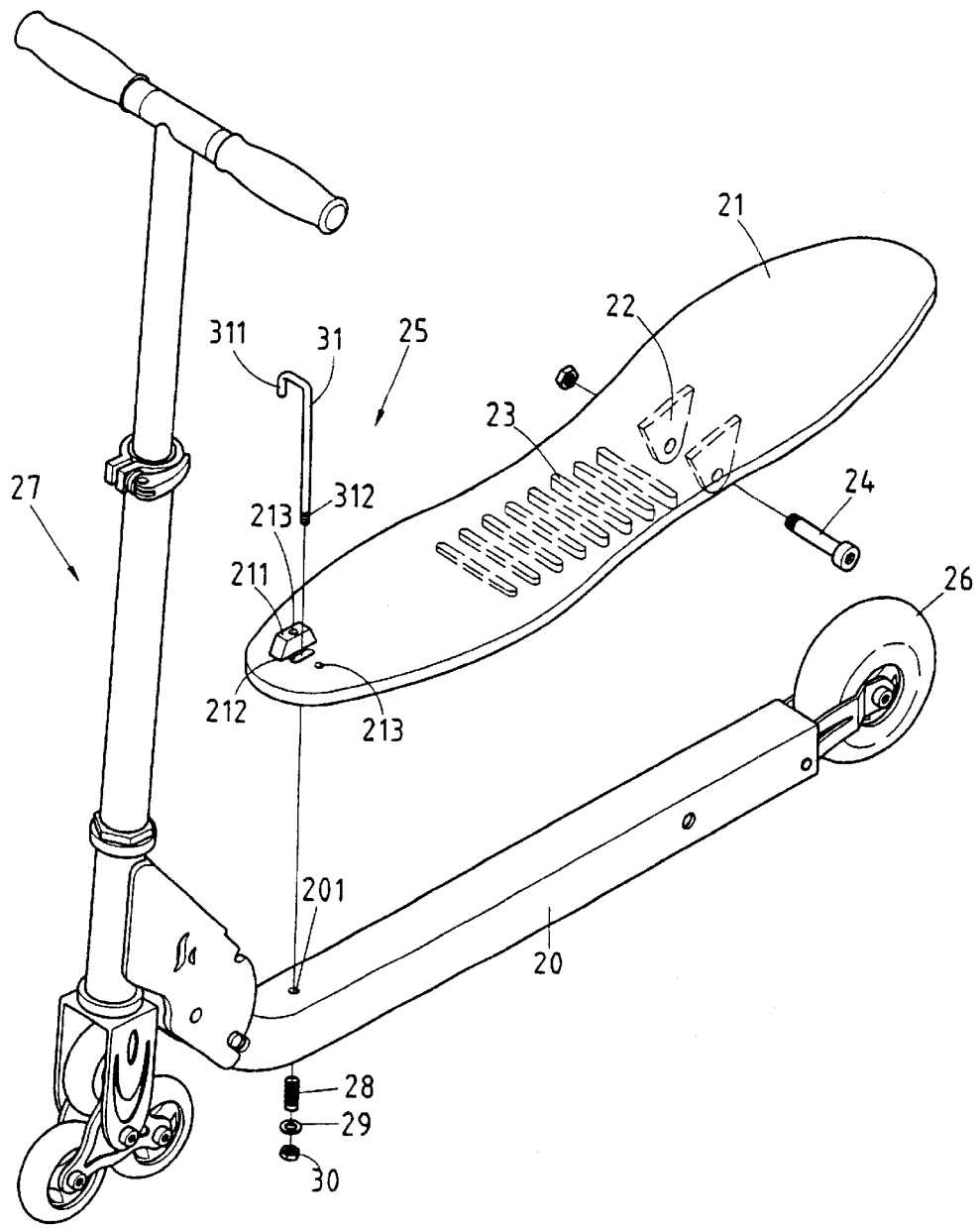
FIG. 4 shows an exploded view of a braking structure of the scooter of the present invention.
Figure 5:
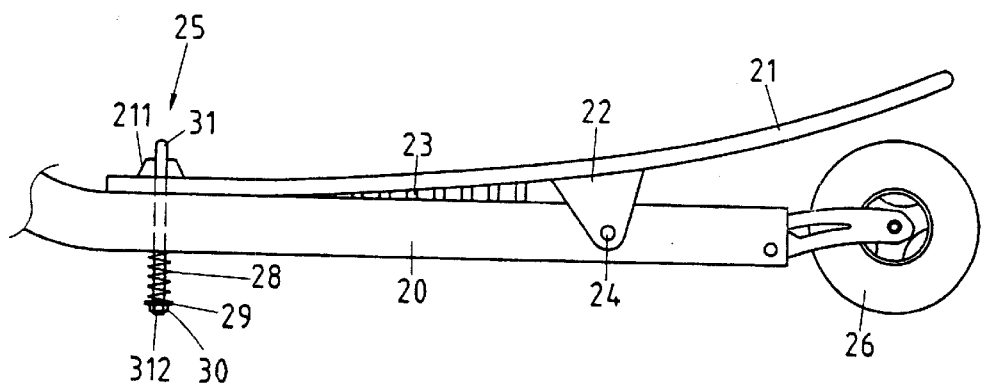
FIG. 5 shows a schematic side view of the braking structure of the scooter of the present invention.
Figure 6:
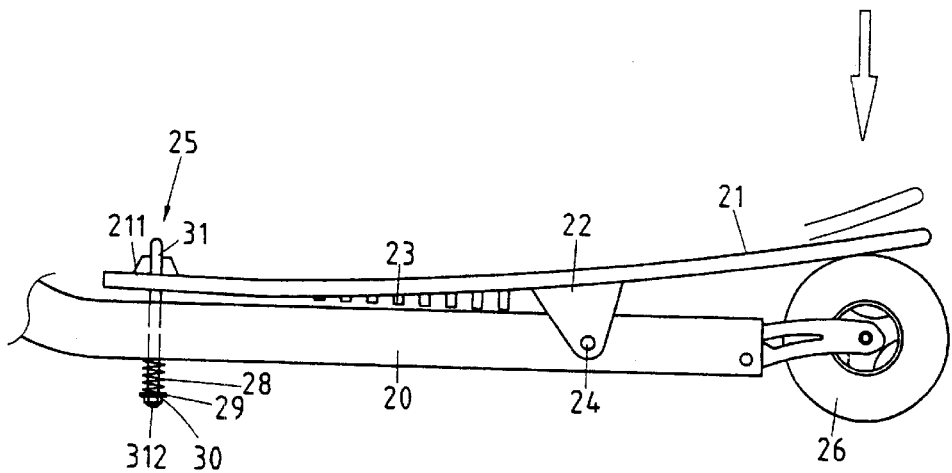
FIG. 6 shows a schematic side view of the braking structure of the scooter of the present invention in action.
Figure 7:
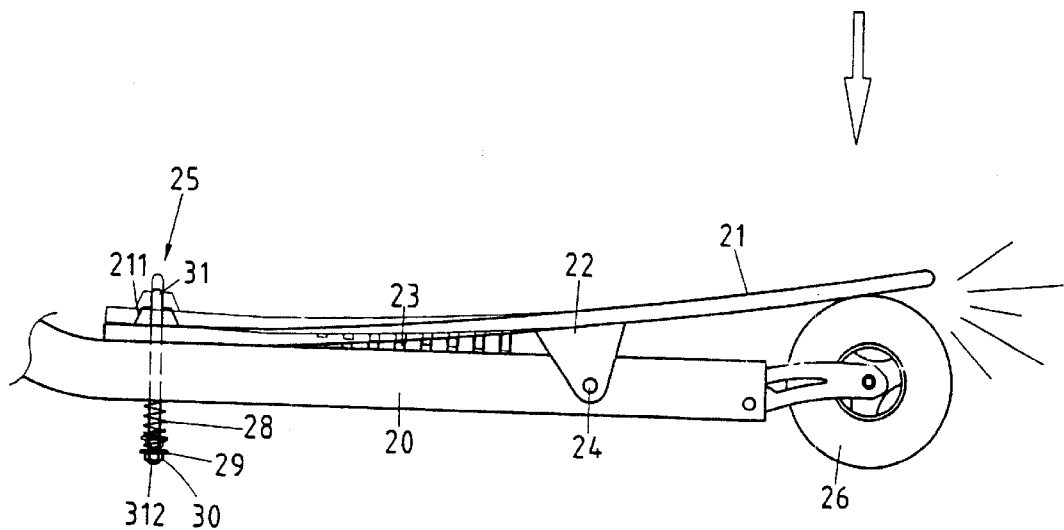
FIG. 7 shows another schematic side view of the braking structure of the scooter of the present invention in action.

As shown in FIGS. 3–7, a scooter embodied in the present invention comprises an upright steering set 27, a base 20 fastened at the front end to the bottom portion of the upright steering set 27, and a footboard 21 mounted on the base 20.

The scooter of the present invention further comprises a braking structure which is formed of the footboard 21, a footboard pivoting member 24, and a recovery member 25.

The footboard 21 has a curved rear segment, which curves upward away from a rear wheel 26 pivoted to the rear end of the base 20. The curved rear segment of the footboard 21 is separated from the rear wheel 26 by an appropriate space. The footboard 21 is provided in the underside of the mid-segment thereof with a plurality of reinforcing ribs 23, and in the underside between the reinforcing ribs 23 and the curved rear segment with a plurality of pivoting pieces 22.

The pivoting member 24 is formed of a pivot 24 and a nut. The footboard 21 is pivotally mounted on the base 20 by the pivoting member 24 in conjunction with the pivoting pieces 22.

The recovery member 25 is fastened to the front end of the footboard 21 and is formed of a retaining rod 31, a spring 28, a washer 29, and a nut 30. The front end of the footboard 21 is provided with a protruded block 211 having a locating hole 213. The front end of the footboard 21 is further provided with a round through hole 212. The base 20 is provided at the front end with a through hole 201 corresponding in location to the round through hole 212 of the footboard 21. The retaining rod 31 has a retaining end 311 and a fastening end 312. The recovery member 25 is mounted on the front end of the footboard 21 such that the retaining end 311 is retained in the locating hole 213 of the protruded block 211, and such that the fastening end 312 is engaged with the fastening nut 30 via the round through hole 212 of the footboard 21 and the through hole 201 of the base 20, and such that the spring 28 and the washer 29 are fitted over the retaining rod 31.

In operation, when the curved rear segment of the footboard 21 is pressed by the foot heel of a rider of the scooter of the present invention, the curved rear segment is forced to swivel on the pivot 24, so as to press against the rear wheel 26 in motion, thereby resulting in the braking effect to slow down or stop the scooter. In light of a relatively large area of the curved rear segment of the footboard 21, the friction area between the curved rear segment of the footboard 21 and the rear wheel 26 is relatively large to prevent the drawbacks of the scooter braking device of the prior art.

It must be noted here that the curved rear segment of the footboard may be provided with a stabilizing piece (not shown in the drawings) for stabilizing the curved rear segment in action.

What is claimed is:

1. An apparatus comprising:
    a scooter having a base rotatably supporting a rear wheel at one end thereof;
    a footboard having a curved rear segment integrally formed therewith and curving away from said rear wheel, said footboard being pivotally mounted by a plurality of pivoting pieces to said base forward of said rear wheel, said curved rear segment pivotally movable between a first position spaced away from a surface of said rear wheel and a second position having an underside contacting said surface of said rear wheel;
    a pivoting member engaging said plurality of pivoting pieces and extending through a hole in said base, said pivoting member being a bolt with a nut affixed thereto, said footboard pivotable about said pivoting member when an external force is applied to a top surface thereof so as to move said curved rear segment between said first and second positions; and a recovery member resiliently fastened to an end of said footboard opposite said curved rear segment, said recovery member connected to said base at an opposite side of said pivoting member from said rear wheel, said recovery member urging said footboard to said first position.

2. The apparatus of claim 1, said footboard having a protruded block affixed adjacent to said end, said protruded block having a locating hole formed therein, said end of said footboard having a round through hole formed therein, said recovery member comprising:

a retaining rod having a retaining end and a fastening end;

a spring fitted over said retaining rod;

a washer fitted over said retaining rod; and a nut engaged with said fastening end of said retaining rod, said retaining end of said retaining rod being retained in said locating hole of said protruded block, said retaining rod extending through said round through hole and a through hole in said base of said scooter.

* * * * *